March 3, 1936.  F. G. HOUGH  2,033,030
FLOOR SWEEPER
Filed Aug. 1, 1935
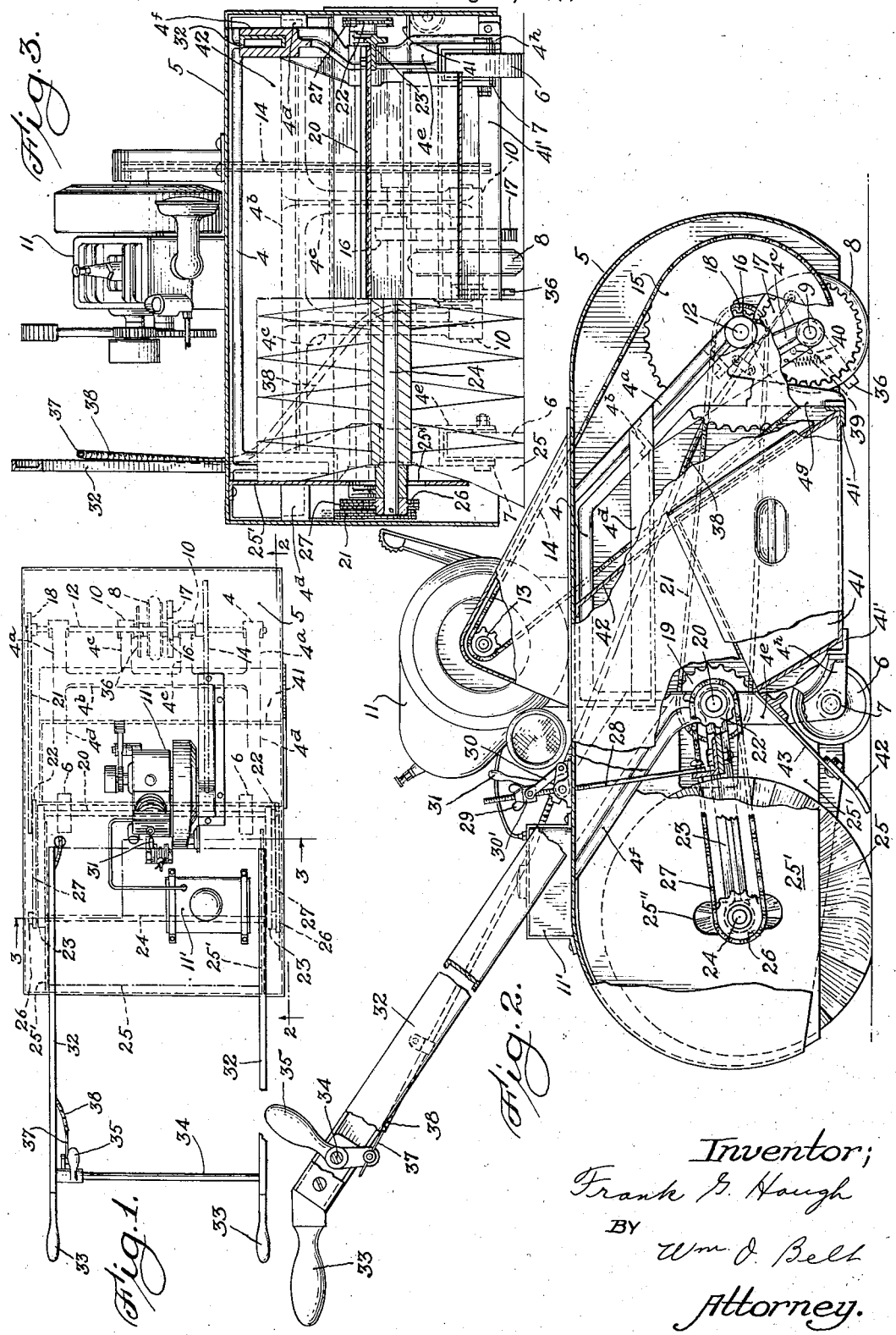
Inventor;
Frank G. Hough
BY
Wm. J. Bell
Attorney.

Patented Mar. 3, 1936

2,033,030

UNITED STATES PATENT OFFICE 2,033,030

FLOOR SWEEPER

Frank G. Hough, Chicago, Ill.

Application August 1, 1935, Serial No. 34,141

10 Claims. (Cl. 15—83)

This invention relates to rotary brush sweepers and its primary object is to provide a simple, compact and efficient manually controlled machine having a power driven brush and traction means and adapted for sweeping floors in factories and warehouses, shipping and other platforms, sidewalks, areaways, street gutters, and other surfaces which are more or less rough and of substantial area.

Another object of the invention is to provide a sweeper which can be easily operated under power within the walls of a building, about pillars and supports, closely adjacent curbs of gutters, and in other places required to be swept from time to time.

Further objects of the invention are to drive the traction wheels and the rotary brush from a single source of power; to lift the rotary brush and the traction wheels out of contact with the floor to enable the power means to be started easily, and to run idle; to enable the rotary brush to be lifted so that the machine may continue to travel without sweeping; to balance the sweeper on it carrying wheels so that the traction means may be easily and manually lifted from engagement with the floor to stop the travel of the sweeper or to enable maneuvering thereof; and to concentrate the action of the brush for scouring particularly stubborn dirty spots.

And further objects are to mount a power driven sweeper on rigid non-steering carrying wheels; to provide a power driven pick-up type floor sweeper without a clutch between the engine and the traction wheels; and to control the travel of the machine by manually tilting the whole machine and thereby lifting the traction wheels from engagement with the floor.

In the accompanying drawing illustrating the invention in a selected embodiment

Fig. 1 is a plan view;

Fig. 2 is a side elevation partly broken away, and partly in section as indicated by the line 2—2 of Fig. 1; and Fig. 3 is a transverse sectional view on the line 3—3 of Fig. 1.

Referring to the drawing, 4 indicates generally the main frame which is suitably shaped to support the various parts as hereinafter described and is covered by a housing 5. The main frame 4 has forwardly and downwardly extending side arms 4a, a transverse bar 4b provided with downwardly and forwardly extending arms 4c, side bars 4d, vertical arms 4e, rearwardly and upwardly extending socket arms 4f, downwardly extending arms 4g on the arms 4a, and forwardly extending arms 4h on the vertical arms 4e.

Carrying wheels 6 are mounted in yokes 7 in the lower ends of the vertical arms 4e of the frame just to the rear of the center of gravity of the machine, and a single traction wheel 8 is mounted on a shaft 9 which is journaled in bearings 10 at the lower ends of the arms 4c of the frame. The carrying wheels 6 are located at the sides of the machine and the traction wheel 8 is located at the front of the machine and midway between the carrying wheels and both the carrying wheels and the traction wheel are non-steering.

An engine 11 mounted on the frame drives the main drive shaft 12 through a sprocket 13 on the engine shaft, a chain 14 and a sprocket 15 on the drive shaft. This drive shaft is mounted in the arms 4a of the main frame and a gear 16 is rigidly mounted on the drive shaft and meshes with a gear 17 on the shaft 9 for driving the traction wheel 8. A sprocket 18 on the drive shaft 12 is connected to a sprocket 19 on a counter-shaft 20 by a chain 21. This counter-shaft is journaled in the vertical arms 4e of the main frame and carries sprockets 22 at its ends. A brush frame 23 is pivotally mounted on the counter-shaft 20 and carries the brush shaft 24 on which the brush 25 is mounted. Sprockets 26 on the ends of the brush shaft are operatively connected to the sprockets 22 by chains 27. The brush is thus driven from the main drive shaft 12, which also drives the traction wheel 8, and the brush revolves in a direction opposite to that of the traction wheel so that dirt swept by the brush will be delivered forwardly and upwardly during the forward travel of the machine. Brush guards 25' are mounted on the housing at the ends of the brush to prevent the bristles of the brush from engaging the chains 27 and other operating parts. An elongated opening 25" is provided in each brush guard to permit up and down movement of the brush shaft 24 which extends therethrough.

Power may be supplied for the machine by an internal combustion engine for which a gas tank 11' would be provided on the housing, but in many places it will be possible to use an electric motor and when I refer herein to an engine it will be understood to mean and include any sort of prime mover suitable for the purpose.

A quick lift for the brush is provided so that the brush may be lifted from engagement with the floor when the engine is to be started or while it is running idle so that no unnecessary drag will be placed upon the engine at such times. This quick lift comprises a rod 28 which is fastened at its lower end to the brush frame 23 and extends upwardly through the housing and is provided with an adjusting nut 29 threaded thereon. A toggle 30 operated by a lever 31 is mounted upon the housing and operates a collar 30' on the rod 28 and engaging the nut 29. By operating the lever the toggle may be straightened to lift the rod 28 and the brush frame until the brush is clear of the floor. The nut 29 is also adjusted to limit the downward movement of the brush frame and brush and properly adjust the brush with respect to the surface to be swept and the kind of work to be done. The downward force of the brush has a fixed limit corresponding to the weight of the brush and associated parts but the brush and the brush frame are free at all times to swing upward when a fixed or solid obstruction is encountered to avoid damage to the brush.

Controlling arms 32 are mounted in the socket arms 4f of the frame and extend upwardly and rearwardly of the sweeper and are provided with suitable handles 33. A cross bar 34 is connected to the arms adjacent the handles for maintaining the arms in parallelism and for strengthening them. A handle lever 35 is pivotally mounted on the cross bar 34 and is connected to a stiff leg 36 by a flexible wire 37 which operates through a flexible cable 38. The stiff leg is pivotally mounted on the traction wheel shaft 9 and is normally held by a spring 39 in a rearwardly inclined position free from contact with the floor as shown in Fig. 2. To lift the traction wheel from engagement with the floor for any purpose the operator presses downward on the handles 33 to pivot the machine on the carrying wheels 6 and lift the front of the machine from the floor, and then manipulates the handle lever 35 to swing the stiff leg downward so that it will engage the floor and support the front end of the machine with the traction wheel free from the floor. A stop 40 is provided on one of the arms 4c to limit the swinging movement of the stiff leg to upright position. The stiff leg is used so that the engine may be started without the drag of the traction wheel thereon, and so that the engine may be operated without causing the machine to travel; and the brush may be lifted from engagement with the floor at the same time, if found desirable. To release the stiff leg it is only necessary for the operator to push the machine forward and the traction wheel will drop into engagement with the floor, and the spring 39 will retract the stiff leg to inoperative position, and at the same time the handle lever 35 will be reset for operation.

A dirt collecting bin 41 is removably mounted on supports 41' carried by the arms 4g and 4h on the frame. The dirt swept forward by the brush engages a baffle which causes it to travel up an dinto the bin an dthis baffle comprises a flexible lip 42 which engages the floor and an apron 43 over which the dirt passes into the bin.

My invention provides a simple, compact and easily operated sweeper for such rough work as sweeping floors in factories and warehouses, loading and receiving platforms, railway platforms, sidewalks and other outdoor places of small area, including gutters. The construction is such that if the total weight of the sweeper, for example, equals two hundred and thirty pounds it may be disposed so that there will be approximately two hundred pounds on the carrying wheels and only thirty pounds on the traction wheel, and therefore with the leverage afforded by the controlling arms only a very few pounds of downward pressure on the handles is required to raise the traction wheel from engagement with the floor preliminary to starting the engine, or while letting the engine idle, or in maneuvering the sweeper. And when a particularly stubborn dirty spot is encountered the controlling arms may be pushed downwardly to lift the traction wheel and increase the pressure of the brush upon the floor as may be required to scour the spot. The sweeper is power driven and is mounted on non-steering wheels but it can be easily maneuvered by operating the controlling arms because of the manner in which the weight of the sweeper is distributed. This also enables the sweeper to be operated as required without the necessity of including a clutch in the construction, which would add to the cost. When the engine is operating and the traction wheel engages the floor the machine will move forward but this forward motion is easily controlled by operating the controlling arms and lifting the traction wheel free from the floor or lowering it to engage the floor as desired. While the engine is operating the traction wheel will be revolving and causing the machine to travel but the movement of the machine is easily controlled by applying pressure to the controlling arms and more easily and more quickly than could be effected with the use of a clutch.

The structure of the invention may be modified and changed as required to satisfy different conditions and therefore I wish it to be understood that the foregoing specification and drawing are for the purpose of description and not for limitation or restriction of the scope of the invention and that I desire to avoil myself of such changes and alterations as fall within the scope of the following claims.

I claim:

1. A sweeper having a main frame and a housing thereon, power means mounted on the frame, a traction wheel mounted at one end of the sweeper and operatively connected to the power means, a rotary brush mounted at the other end of the sweeper and operatively connected to the power means, carrying wheels mounted on the frame adjacent the center of gravity of the sweeper, and controlling handle arms extending rearwardly from the brush end of the sweeper for pivoting the sweeper about the carrying wheels to lift the traction wheel from engagement with the floor.

2. A sweeper having a main frame and a housing thereon, power means mounted on the frame, a traction wheel mounted at one end of the sweeper and operatively connected to the power means, a rotary brush mounted at the other end of the sweeper and operatively connected to the power means, carrying wheels mounted on the frame adjacent the center of gravity of the sweeper, controlling handle arms extending rearwardly from the brush end of the sweeper for pivoting the sweeper about the carrying wheels to lift the traction wheel from engagement with the floor, a stiff leg operatively associated with the traction wheel, and means for operating the stiff leg to support the traction wheel out of engagement with the floor.

3. A sweeper having a main frame, a non-steering traction wheel mounted on the frame at one end thereof, non-steering carrying wheels mounted on the frame, a rotary brush mounted in the frame, power means mounted on the frame, means connecting the power means with the traction wheel and the rotary brush for driving said traction wheel and brush, and means for pivoting the sweeper about the carrying wheels to lift the traction wheel from engagement with the floor to steer the sweeper.

4. A sweeper having a main frame and a housing thereon, power means mounted on the frame, a traction wheel mounted at one end of the sweeper and operatively connected to the power means, a rotary brush mounted at the other end of the sweeper and operatively connected to the power means, carrying wheels mounted on the frame adjacent the center of gravity of the sweeper, controlling handle arms extending rearwardly from the brush and of the sweeper for pivoting the sweeper about the carrying wheels to lift the traction wheel from engagement with the floor, a stiff leg operatively associated with the traction wheel, and means associated with the controlling handle arms connected with the stiff leg to support the traction wheel out of engagement with the floor.

5. A sweeper having a main frame and a housing thereon, power means mounted on the frame, a shaft at the forward end of the sweeper and operatively connected to the power means, a traction wheel mounted on said shaft, a rotary brush mounted at the other end of the sweeper and operatively connected to the power means, carrying wheels mounted on the frame adjacent the center of gravity of the sweeper, a stiff leg pivotally supported on said shaft, a handle lever associated with the controlling handle arms, and a connnection between said handle lever and the stiff leg whereby the stiff leg may be operated to support the traction wheel out of engagement with the floor.

6. A sweeper having a main frame and a housing thereon, power means mounted on the frame, a traction wheel mounted at one end of the sweeper and operatively connected to the power means, a rotary brush mounted at the other end of the sweeper and operatively connected to the power means, carrying wheels mounted on the frame adjacent the center of gravity of the sweeper, controlling handle arms extending rearwardly from the brush end of the sweeper for pivoting the sweeper about the carrying wheels to lift the traction wheel from engagement with the floor, and a quick lift for lifting the brush from engagement with the floor including means for holding the brush in raised position and means for adjusting the ground pressure of the brush in lowered position.

7. A sweeper having a main frame and a housing thereon, power means mounted on the frame, a traction wheel mounted at one end of the sweeper and operatively connected to the power means, a rotary brush mounted at the other end of the sweeper and operatively connected to the power means, carrying wheels mounted on the frame adjacent the center of gravity of the sweeper, controlling handle arms extending rearwardly from the brush end of the sweeper for pivoting the sweeper about the carrying wheels to lift the traction wheel from engagement with the floor, a stiff leg for holding the traction wheel from engagement with the floor, and a quick lift for lifting the brush from engagement with the floor including means for holding the brush in raised position and means for adjusting the ground pressure of the brush in lowered position.

8. A sweeper having a main frame and a housing thereon, power means mounted on the frame, a traction wheel mounted at the front of the sweeper and operatively connected to the power means, a rotary brush mounted at the rear of the sweeper and operatively connected to the power means to revolve in a direction opposite to that of the traction wheel, carrying wheels mounted on the frame slightly back of the center of gravity of the sweeper, means for lifting the brush out of engagement with the floor, and controlling handle arms connected to the frame and extending rearwardly of the sweeper for pivoting the sweeper about the carrying wheels to lift the traction wheel from engagement with the floor.

9. A sweeper having a main frame comprising side arms, a transverse bar, arms extending downwardly and forwardly from said transverse bar, vertical arms located behind said downwardly and forwardly extending arms, socket arms extending rearwardly and upwardly from said vertical arms, carrying wheels mounted in said vertical arms, a traction wheel mounted in said downwardly and forwardly extending arms, a frame pivoted to the vertical arms, a brush mounted to rotate in said frame, a drive shaft journaled in the side arms, power means mounted on the frame, means transmitting power from the power means to the drive shaft and from the drive shaft to the traction wheel and to the brush, and controlling arms engaged with and secured in said socket arms and projecting rearwardly beyond the brush for pivoting the sweeper about the carrying wheels to lift the traction wheel from engagement with the floor.

10. A sweeper having a main frame and a housing thereon, power means mounted on said frame, a main drive shaft journaled in said frame and operatively connected to the power means, a traction wheel mounted on said frame at the front thereof, a countershaft journaled in said frame, a brush frame pivotally mounted on the countershaft and having a rotary brush mounted therein, means including the countershaft operatively connecting the brush and traction wheel to the main drive shaft whereby the brush and traction wheel will be rotated in opposite directions, a pair of carrying wheels mounted on the main frame, a removable bin mounted on the main frame for receiving dirt swept up by the brush, an apron for directing dirt from the brush to the bin and for protecting the carrying wheels, controlling handle arms connected to the main frame and extending rearwardly of the sweeper for pivoting the sweeper about the carrying wheels to lift the traction wheel from engagement with the floor, a normally inoperative stiff leg, an operating lever on the handle arms operatively connected to the stiff leg for selectively holding the traction wheel out of engagement with the floor, adjustable means for adjusting the ground pressure of the brush, and means coperating with the adjustable means for quickly raising and lowering the brush into and out of engagement with the floor.

FRANK G. HOUGH.